July 1, 1947.  R. H. GEISER  2,423,379
APPARATUS FOR FEEDING SOLUTION TO WATER COMPRISING A RECEPTACLE
HAVING A VERTICALLY ADJUSTABLE CHAMBER CONNECTED THEREWITH
Filed Aug. 14, 1942  2 Sheets-Sheet 1
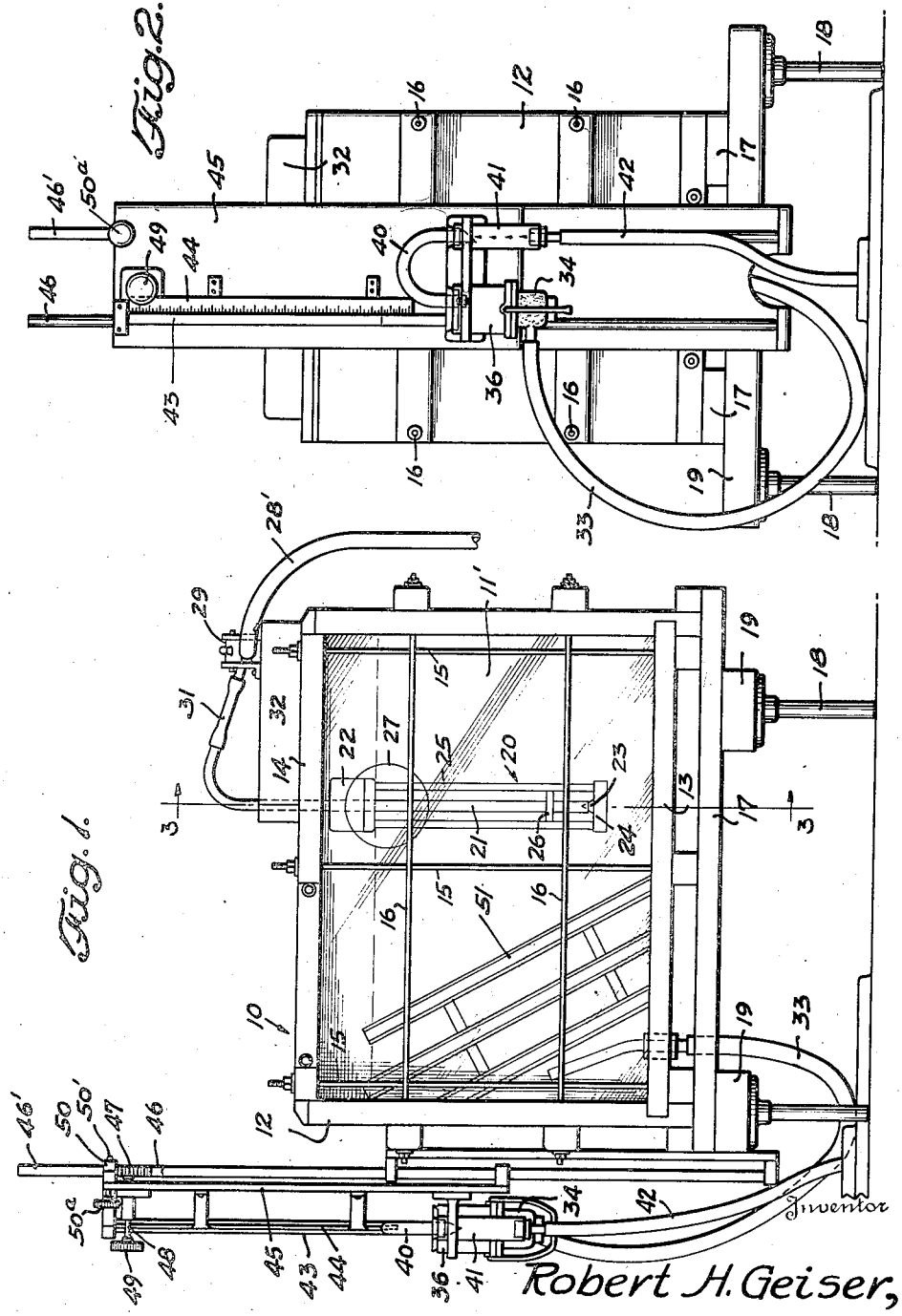
Inventor
Robert H. Geiser,
By
Attorney July 1, 1947.  R. H. GEISER  2,423,379
APPARATUS FOR FEEDING SOLUTION TO WATER COMPRISING A RECEPTACLE
HAVING A VERTICALLY ADJUSTABLE CHAMBER CONNECTED THEREWITH
Filed Aug. 14, 1942  2 Sheets-Sheet 2
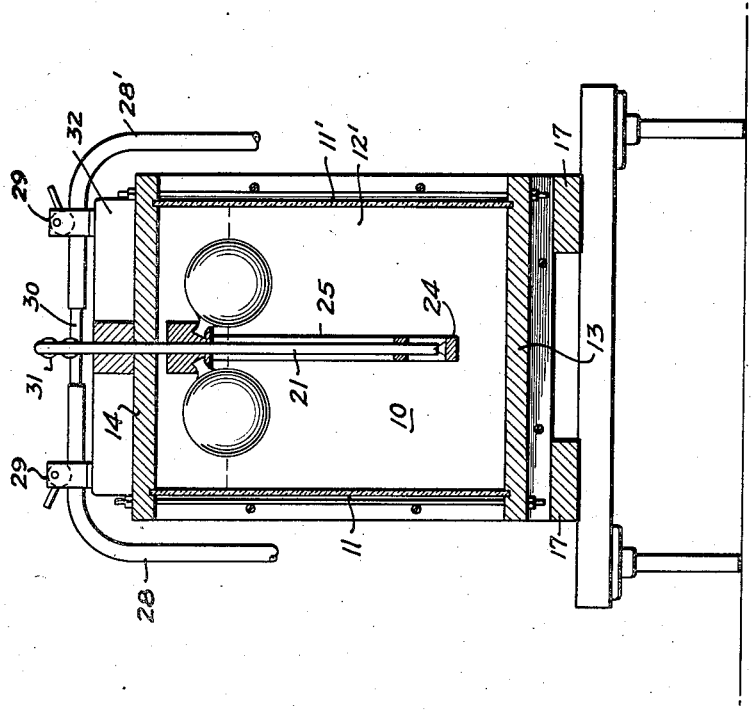
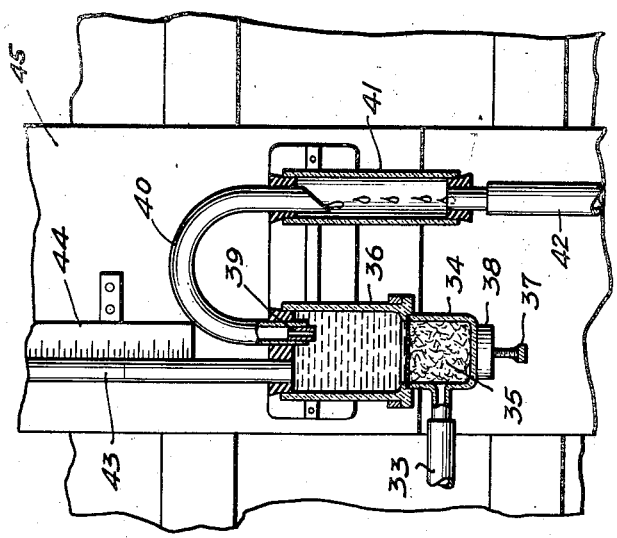
Inventor
Robert H. Geiser,
By A. Yates Dowell
Attorney Patented July 1, 1947

2,423,379

UNITED STATES PATENT OFFICE 2,423,379

APPARATUS FOR FEEDING SOLUTION TO WATER COMPRISING RECEPTACLES HAVING VERTICALLY ADJUSTABLE CHAMBERS CONNECTED THEREWITH

Robert H. Geiser, Waynesboro, Pa.

Application August 14, 1942, Serial No. 454,850

5 Claims. (Cl. 210—39)

1

This invention relates to the treatment of water or other fluids by the introduction therein of a measured or predetermined quantity of chemical solution, for example, the feeding of chlorine or other appropriate chemical or acid to a supply of city water, swimming pool, or the like, and an object of the same is to provide an apparatus for this purpose whereby an accurate feed of treating solution may be had automatically over an indefinite period of time with a minimum of manual attention and with no power requirements beyond the apparatus itself and a minimum of moving parts.

Another object of the invention is to provide a chemical feeding apparatus of the type specified which is of simple construction yet reliable and capable of convenient adjustment to obtain the desired quantity of feed of the solution to a body of water or other fluid being treated.

Another object is to provide apparatus for feeding a treating solution to a body of water wherein trapping of gases or gas locks are avoided as well as crystallization of chemicals with resultant unsatisfactory operation.

A further object is to provide apparatus for treating a body of water or other fluid with a disinfecting solution capable of a wide range of capacity without sacrificing accuracy and reliability.

A still further object of the invention is to generally improve upon apparatus for feeding a treating solution to water or other fluids.

The foregoing and other objects and advantages will become apparent in view of the following description taken in conjunction with the drawings, wherein:

Figure 1 is a view in side elevation of apparatus in accordance with the invention;

Fig. 2 is a front elevation thereof;

Fig. 3 is a section taken substantially on the line 3—3 of Fig. 1; and

Fig. 4 is an enlarged fragmentary sectional view of the filtering and feeding unit forming part of the apparatus.

Briefly stated, the apparatus comprises a constant level and settling chamber in which a suitable head of the treating solution is automatically maintained, preferably by gravity pressure, and in conjunction with this chamber there is provided a filtering and feeding unit which is adjustable with respect to the head maintained in the constant level chamber and also carries a guage which is preferably calibrated to indicate the rate or quantity of solution fed to the body of water or other fluid being treated.

2

Referring to the drawings in detail, the constant level and settling chamber is generally indicated at 10, and as herein illustrated is made up of transparent side panels 11, 11', end panels 12, 12', a floor 13 and a cover 14. In practice, I have found that materials such as clear plastic, glass, and the like have been satisfactory for the panels 11, 11', although any materials which will resist deterioration or corrosion may be utilized. I prefer that at least one of the panels of the chamber or tank 10 be made transparent to render the interior thereof visible at all times. The floor 13 and cover 14 may be grooved to snugly receive the upper and lower edges of the side panels in fluid tight relation and clamped by means of vertical rods 15, while the end panels or walls 12, 12' may be grooved vertically to receive the end edges of the side panels and clamped or drawn together by means of longitudinally extending rods 16. The tank is shown disposed on a platform 17 which is held in elevated position by means of legs 18 and cross members 19. However, it is intended that the apparatus as a whole be portable and hence the tank 10 may be disposed on any suitable support.

Within the constant level chamber is mounted a float valve unit generally indicated at 20, note Figs. 1 and 3, and as here shown comprises a vertical tube or pipe 21 which projects downwardly a suitable distance into the constant level chamber 10 and carries a vertically-slidable head or bracket 22. A valve 23 is mounted on a base 24 to coact with the lower or inlet end of the pipe 21, said base 24 being connected to the head or bracket 22 by means of vertical rods 25 having at the lower extremity thereof a vertically-slidable guide 26 for maintaining the valve 23 in proper centered relation with respect to the lower open end or feed nozzle of the pipe 21. Anchored to the head or bracket 22 are floats 27, preferably made of glass, plastic, or other suitable material unaffected by the chlorine or other solution.

The solution may be conducted to the intake pipe 21 from a suitable source of supply, not shown, through flexible conduits 28, 28' which project through clamp members 29 and connect with a coupling member or T-head 30, the latter being connected to pipe 21 by means of a flexible piece of hose or the like 31. The clamps 29 are shown supported on a block 32 which at its one end is split to receive and anchor the tube or pipe 21.

The operation of the float valve unit will be obvious, there being a constant pressure of solution (preferably by gravity flow) applied to the inlet pipe or tube 21 through the conduits 28, 28', and when the solution in the chamber 10 falls or drops due to feed of the solution into the main body of water, the floats 27 will permit the valve 23 to lower by gravity, increasing the flow of solution into the tank, the valve gradually closing off inflow as the level rises in the tank.

The treating solution is taken from the tank 10 by means of conduit 33 to a filter chamber 34 which has therein a suitable filtering medium 35 such as glass wool or the like. From the filter chamber 34 the solution passes upwardly into a container or bowl 36, herein termed a "pressure chamber," the filter chamber 34 being detachably clamped to the base of said bowl by means of swinging bracket 37 and clamp member 38, note particularly Fig. 4. The solution in the chamber or bowl 36 is maintained under pressure by the head of the solution in the tank 10, and this pressure causes a flow of solution from the chamber 36 through feed jet or orifice 39 (to be more fully described) and thence into pipe 40 which is in the form of a removably or detachably mounted elbow or U-bend and discharges into a transparent sight feed chamber 41, so that the feed of solution may be under observation at all times. From the sight chamber 41 the solution passes by way of conduit 42 to the body of water or other fluid being treated. The feed jet or orifice 39 is adapted to be removed and replaced by feed orifices of such capacity as will provide the desired volume of feed of solution to the body of water being treated. Thus, assuming that a predetermined range of feed has been charted for a certain body of water in view of a certain type or strength of solution, then the feed orifice 39 may be removed and replaced by another orifice of proper capacity. The maximum capacity of the orifice should be gauged with a view towards utilizing minimum head pressure so that accuracy of control may be realized while at the same time a dependable feed is had without clogging or obstruction of the feed orifice.

It will be also noted that the orifice is submerged in the solution always present in pressure chamber 36, and since the chamber 36 as well as the sight chamber 41 are provided with air-tight or sealed covers, there will be no evaporation of the solution within the orifice, with consequent crystallization of chemicals and resulting clogging.

The sight feed chamber 41 permits observation at any time desired of the rate of feed through the orifice 39, and should the system become clogged for any reason whatsoever, the inoperativeness of the system will be rendered apparent simply by observing the chamber 41.

A gauge glass 43 has its lower end projecting into the pressure chamber 36 so that any fluid or indicating medium in said glass will be affected directly by the pressure in said chamber. This gauge glass projects upwardly in parallel relation to a calibrated gauge which may be calibrated in conjunction with the gauge glass in a manner such that it will indicate definitely the feed of solution through orifice 39. Thus, a calibration may be made for each orifice, which in turn facilitates the making of performance charts to be used as a ready reference in determining any desired rate of feed for different types of solution.

The entire unit just described including the filter chamber 34, pressure chamber 36 and observation chamber 41 together with the gauge glass 43 and gauge 44, is carried by a panel 45 which is mounted for vertical adjustment on guides 46, 46'. The guide 46 is in the nature of a rack-bar, and coacting therewith is a ratchet wheel 47 provided with an outwardly projecting stem or shaft 48 having secured on the outer end thereof an adjusting handle or knob 49. By rotating the knob 49, the panel together with the parts carried thereby may be raised or lowered to thereby adjust the feed of the pressure chamber 36 with respect to the level of liquid in the tank 10.

In order to maintain the panel in adjusted position, any suitable means may be utilized such as eccentric 50 secured on the inner end of stem 50' which projects outwardly through the panel and has secured on the outer end thereof a knob 50a. By rotating the knob 50a, the eccentric 50 may be jammed against the guide 46' to thereby maintain the panel in the desired adjusted position.

A baffle member 51 may be disposed in the tank 10 between the incoming solution and the outflow pipe 33 to avoid turbulence in the region of said outlet. This baffle member 51 may also be constructed in the nature of a filter if so desired to ensure against foreign matter being taken into the system at this point.

It will be noted that the intake end of conduit 33 projects well above the bottom of tank 10 to ensure against carrying any sediment that may settle in said tank into the system.

A brief description of the operation of the apparatus together with some of the advantages incident thereto follows:

Any desired type of treating solution may be used such as chlorine, acid or the like, and this may be in the form of make-up water or a supply of solution in undiluted state. A supply of the solution is preferably disposed so that it will flow by gravity through conduits 28 and 28', thereby maintaining the solution in these conduits under constant head pressure. Thus when the valve 23 moves clear of the lower end of the pipe 21, the treating solution will pass into the tank 10. In this manner, a constant level is maintained in the tank 10 due to the fact that the floats 27 will open or close the valve 23 in direct relation to the level of liquid or solution in said tank 10.

The pressure of the solution in the chamber 36 is in direct relation to the head pressure in the tank 10, so that if the chamber 36 is raised or lowered the pressure therein may be decreased or increased as desired, and this adjusted feed may be read on the calibrated gauge 44. Thus an observer may readily determine from the gauge the amount of solution being fed to the body of water being treated.

It will be noted that the parts of the apparatus which come in contact with the walls are made of materials which will resist deterioration. In practice, molded plastics have proved satisfactory, particularly in view of the fact that they may be made transparent or semi-transparent. The apparatus operates through gravity and is automatic once adjustment has been made. Furthermore, the parts are of simple construction and no outside source of power is necessary. The entire unit is compact, portable and has the advantage of quick and convenient installation. The feed has been found to be highly accurate and dependable.

It will be understood that certain changes in construction and design may be adopted without departing from the spirit or scope of the invention as defined by the appended claims.

I claim:
1. In apparatus for feeding a treating solution to a body of water or like fluid, a chamber for receiving solution, means for maintaining a constant level of solution in said chamber, a pressure chamber, a support for said latter chamber, a conduit for conducting solution from said constant level chamber to said pressure chamber, conduit having an interchangeable restricted orifice extending into said pressure chamber and submerged in the fluid therein, said conduit leading therefrom to the body of water being treated, and manually controlled means for adjusting the height of said support to thereby adjust the height of said pressure chamber with respect to the level of solution in said constant level chamber to thereby vary the feed of solution from said pressure chamber to and through said latter conduit.

2. In apparatus for treating a body of water or like fluid with a solution, a tank providing a constant level and settling chamber, means for conducting solution to said tank, means for controlling the flow of solution into said tank to automatically maintain a substantially constant level of solution therein, a manually operable vertically adjustable pressure chamber, means for conducting solution from said tank to said pressure chamber, means for conducting solution from said pressure chamber to the body of water being treated including an interchangeable orifice in a submerged position in the pressure chamber, and means for vertically adjusting of said pressure chamber with respect to said constant level chamber varying the pressure imposed on the solution in the pressure chamber to in turn vary the amount of solution fed from said pressure chamber.

3. In apparatus for feeding a treating solution to a body of water or other fluid, a tank providing a constant level chamber, means for conducting a solution under pressure to said tank, a float valve controlling the flow of solution from said conducting means to maintain a constant level of solution in said chamber, means for conducting a solution from the constant level chamber to the supply of water being treated, said latter means having interposed therein a pressure chamber and a transparent sight chamber, said pressure chamber being provided with a reduced outlet orifice, means for vertically adjusting said pressure chamber, a calibrated gauge member, a transparent gauge glass in communication with said pressure chamber and paralleling said gauge to indicate the amount of solution being fed from said pressure chamber, whereby vertical adjustment of said pressure chamber with respect to the level of solution in said tank will determine the amount of solution fed through said orifice.

4. In apparatus of the class specified, a tank, means for conducting solution under pressure to said tank, a float valve for automatically maintaining a constant level of solution in said tank, means for conducting solution from said tank to the body of water being treated, said latter means having interposed therein a filter chamber and a pressure chamber, said pressure chamber being provided with a restricted feed orifice, a panel mounting the pressure chamber, means for vertically adjusting said chamber on said panel to thereby vary the height of said chamber with respect to the solution in said tank and in turn vary the feed of solution through said orifice, and a gauge communicating with said pressure chamber calibrated to indicate the amount of solution being fed through said orifice.

5. In apparatus of the class specified, a tank, means for conducting a solution under pressure to said tank, valve means for automatically maintaining a constant level of solution in said tank, said tank having a transparent wall so that the contents and apparatus therein are visible at all times, a bodily adjustable transparent pressure chamber having a filter chamber communicating therewith, a flexible conduit for conducting solution from said tank to said filter chamber and thence to said pressure chamber, said pressure chamber having a restricted outlet orifice, a flexible conduit communicating said outlet orifice with the body of water being treated, manual means for adjusting the height of said pressure chamber with respect to level of solution in said tank to thereby vary the rate of feed through said orifice, and a calibrated gauge in communication with said pressure chamber to indicate rate of feed through said orifice.

ROBERT H. GEISER.

REFERENCES CITED

The following references are of record in the file of this patent:

UNITED STATES PATENTS

| Number | Name | Date |
|---|---|---|
| 1,966,265 | Schmelkes | July 10, 1934 |
| 2,096,021 | Aherne | Oct. 19, 1937 |
| 2,136,776 | Pugatz | Nov. 15, 1938 |
| 2,153,345 | Senyal | Apr. 4, 1939 |
| 2,148,902 | Everson | Feb. 28, 1939 |
| 885,828 | Bartlett | Apr. 28, 1908 |
| 1,225,977 | Ledoux | May 15, 1917 |
| 522,729 | Desrumaux | July 10, 1894 |
| 2,086,957 | Peet | July 13, 1937 |
| 1,899,764 | Machlet | Feb. 28, 1933 |
| 1,223,021 | Allen | Apr. 17, 1917 |
| 571,350 | Fayette | Nov. 17, 1896 |
| 1,610,283 | Hill | Dec. 14, 1926 |
| 1,749,130 | Craig | Mar. 4, 1930 |
| 2,230,004 | Morgan | Jan. 28, 1941 |
| 1,048,833 | Hickox et al. | Dec. 31, 1912 |
| 1,679,373 | Pownall | Aug. 7, 1928 |

FOREIGN PATENTS

| Number | Country | Date |
|---|---|---|
| 3,397 | Great Britain | 1910 |
| 413,020 | Germany | Apr. 30, 1925 |